United States Patent
Ichii et al.

(10) Patent No.: US 8,774,590 B2
(45) Date of Patent: Jul. 8, 2014

(54) YTTERBIUM-DOPED OPTICAL FIBER

(75) Inventors: Kentaro Ichii, Sakura (JP); Shoji Tanigawa, Sakura (JP); Tomofumi Arai, Sakura (JP)

(73) Assignee: Fujikura Ltd., Tokyo (JP)

( * ) Notice: Subject to any disclaimer, the term of this patent is extended or adjusted under 35 U.S.C. 154(b) by 52 days.

(21) Appl. No.: 13/097,563

(22) Filed: Apr. 29, 2011

(65) Prior Publication Data
US 2011/0206341 A1   Aug. 25, 2011

Related U.S. Application Data (63) Continuation of application No. PCT/JP2009/005862, filed on Nov. 4, 2009.

(30) Foreign Application Priority Data

Nov. 4, 2008  (JP) ................................. 2008-283165
Feb. 6, 2009  (WO) .................. PCT/JP2009/052064

(51) Int. Cl.
*G02B 6/02* (2006.01)
*H01S 3/067* (2006.01)
*H01S 3/16* (2006.01)

(52) U.S. Cl.
CPC ........... *H01S 3/06716* (2013.01); *H01S 3/1693* (2013.01); *H01S 3/1618* (2013.01); *C03C 2201/28* (2013.01)
USPC ........................................................ 385/142

(58) Field of Classification Search
USPC ............................................................ 372/6
See application file for complete search history.

(56) References Cited

U.S. PATENT DOCUMENTS

| 4,830,463 | A | 5/1989 | Lemaire et al. |
| 5,937,134 | A | 8/1999 | DiGiovanni |
| 6,560,009 | B1 | 5/2003 | Andrejco et al. |
| 6,816,514 | B2 * | 11/2004 | Jiang et al. ........................ 372/6 |
| 2009/0011233 | A1 * | 1/2009 | Morasse et al. ............... 428/375 |

FOREIGN PATENT DOCUMENTS

| JP | 1-298043 A | 12/1989 |
| JP | 11-112070 A | 4/1999 |
| JP | 2003-124547 A | 4/2003 |

OTHER PUBLICATIONS

Written Opinion (PCT/ISA/237) dated Dec. 1, 2009, in PCT/JP2009/005862.
Tammela, Simo et al., "The Potential for Direct Nanoparticle Deposition for the Next Generation of Optical Fibers", The Proceedings of SPIE Photonics West 2006, vol. 6116-16, 9 pages.

(Continued)

*Primary Examiner* — Hemang Sanghavi
(74) *Attorney, Agent, or Firm* — Sughrue Mion, PLLC (57) ABSTRACT

Provided is an ytterbium-doped optical fiber including a core containing at least ytterbium, aluminum and phosphorous and a clad surrounding the core, wherein a molar concentration of diphosphorus pentoxide with respect to phosphorus in the core is equal to a molar concentration of aluminum oxide with respect to aluminum in the core, wherein a ratio of a molar concentration of diphosphorus pentoxide with respect to phosphorus in the core to the molar concentration of ytterbium oxide with respect to ytterbium in the core is higher than or equal to 10 and lower than or equal to 30, and wherein a relative refractive index difference between the core and the clad is higher than or equal to 0.05% and lower than or equal to 0.30%.

4 Claims, 4 Drawing Sheets

(56) References Cited

OTHER PUBLICATIONS

Kitabayashi, T. et al., "Population Inversion Factor Dependence of Photodarkening of Yb-doped Fibers and its Suppression by Highly Aluminum Doping", The Proceedings of OFC 2006, 3 pages.

Engholm, M. et al., "Preventing photodarkening in ytterbium-doped high power fiber lasers; correlation to the UV-transparency of the core glass", The Proceedings of Optics Express vol. 16, 2008, p. 1260-1268.

Lipatov, D.S. et al., "Optical Properties of Highly $Al_2O_5$ and $P_2O_5$ Doped Silica Hosts for Large Mode Area Fiber Lasers and Amplifiers", The Proceedings of ECOC 2007, Poster Session P020, 2 pages.

DiGiovanni, D.J. et al., "Structure and Properties of Silica Containing Aluminum and Phosphorus Near the $AlPO_4$ Join", Journal of Non-Crystalline Solids 113, 1999, p. 58-64.

Office Action dated Mar. 26, 2013, issued in Japanese Patent Application No. 2010-536689.

Sylvia Jetschke et al., Efficient Yb laser fibers with low photodarkening by optimization of the core composition, Optics Express, Optical Society of America, Sep. 29, 2008, vol. 16, No. 20, pp. 15540-15545.

Tammela, Simo et al., "The Potential of Direct Nanoparticle Deposition for the Next Generation of Optical Fibers", The Proceedings of SPIE Photonics West 2006, vol. 6116-16, 9 pages.

Lipatov, D.S. et al., "Optical Properties of Highly $Al_2O_3$ and $P_2O_5$ Doped Silica Hosts for Large Mode Area Fiber Lasers and Amplifiers", The Proceedings of ECOC 2007, Poster Session P020, 2 pages.

DiGiovanni, D.J. et al., "Structure and Properties of Silica Containing Aluminum and Phosphorous Near the $AlPO_4$ Join", Journal of Non-Crystalline Solids 113, 1989 p. 58-64.

\* cited by examiner

YTTERBIUM-DOPED OPTICAL FIBER

CROSS-REFERENCE TO RELATED APPLICATION

This is a Continuation Application of International Application. No. PCT/JP2009/005862, filed on Nov. 4, 2009, which claims priority to Japanese Patent Application No. 2008-283165 filed on Nov. 4, 2008 and International Application No. PCT/JP2009/052064, filed on Feb. 6, 2009. The contents of the aforementioned applications are incorporated herein by reference.

BACKGROUND OF THE INVENTION

1. Field of the Invention

The present invention relates to an ytterbium-doped optical fiber for light amplification to which ytterbium is doped. More specifically, the present invention relates to an ytterbium-doped optical fiber in which deterioration in output, known as "photodarkening", and non-linear optical effects are inhibited.

2. Description of the Related Art

A fiber for light amplification has a configuration in which a rare-earth element or the like is doped to a core and/or a clad of an optical fiber having an axisymmetric waveguide structure, and is used as a photoactive medium for fiber amps, fiber lasers or the like. In particular, a fiber laser using an Yb-doped optical fiber containing ytterbium (Yb) as a rare-earth element as an optical fiber for light amplification can obtain output light with high beam quality and high power output. Further, such a fiber laser has an oscillation wavelength of output light of about 1 μm which is substantially equal to that of Nd—YAG, one kind of conventional high output laser. For this reason, an Yb-doped optical fiber is expected to be practically applied as a laser medium for high output light sources applied to material processing such as welding, marking and cutting.

In fiber-type optical amplifiers or fiber lasers, a phenomenon called "photodarkening" is known. This is a phenomenon in which the transmission loss of optical fibers caused by excited light or signal light propagating in fibers is increased. When such transmission loss increases, the gain of the optical fiber, in which a rare-earth element is doped and which is an amplification media, deteriorates. That is, the output of fiber-type optical amplifiers or fiber lasers is deteriorated over time, thus causing problems from the viewpoint of reliability.

Generally, in a case where high output laser light is propagated to optical fibers, light of a wavelength different from the laser light is generated and amplified, whereby it is known that so-called "stimulated Raman scattering" is generated. As a result, problems, such as deterioration in the strength of the propagated laser output light and widening of the spectrum range of the laser light occur. That is, it is preferable that optical fibers are designed to prevent the appearance of non-linear optical effects, exemplified by stimulated Raman scattering.

Several methods for inhibiting photodarkening have been disclosed to date. For example, a method for inhibiting photodarkening by applying a specific manufacturing method called "direct nanoparticle deposition (DND)" has been disclosed (for example, see Non-Patent Document 1).

Further, a method for inhibiting photodarkening by adding a high concentration of aluminum to optical fibers has been disclosed (for example, see Non-Patent Document 2).

Further, a method for inhibiting photodarkening by adding a high concentration of phosphorus to optical fibers has been disclosed (for example, see Non-Patent Document 3).

Further, the following information has been disclosed in regard to the refractive index of silica glass.

It is disclosed that an increase in refractive index of the core can be inhibited by adding a combination of aluminum oxide ($Al_2O_3$) and diphosphorus pentoxide ($P_2O_5$) to a preform made of silica glass ($SiO_2$) (for example, see Non-Patent Document 4 and 5). In particular, it is disclosed that as the concentrations (mol %) of aluminum oxide and diphosphorus pentoxide added are approximated to equal amounts, the refractive index approximates the refractive index of pure silicon dioxide.

Further, an optical fiber, in which rare-earth elements, germanium, aluminum and phosphorus are added to a core thereof, is disclosed in Patent Document 1. This Patent Document 1 discloses that the difference in refractive index between the core and the clad is decreased and recrystallization of rare-earth elements is inhibited by adding these elements to the core.

REFERENCE

[Patent Document]

[Patent Document 1] Japanese Unexamined Patent Application, First Publication No. H11-112070

[Non Patent Document]

[Non-Patent Document 1] S. Tammela et al., The Potential of Direct Nanoparticle Deposition for the Next Generation of Optical Fibers, The Proceeding of SPIE Photonics West 2006, Vol. 6116-16 (2006)

[Non-Patent Document 2] T. Kitabayashi et. al., Population Inversion Factor Dependence of Photodarkening of Yb-doped Fibers and Its Suppression by Highly Aluminum Doping, The Proceedings of OFC 2006, OThC5(2006)

[Non-Patent Document 3] M. Engholm et. al., Preventing photodarkening in ytterbium-doped high power fiber laser; correlation to the UV-transparency of the core glass, The Proceeding of Optics Express Vol. 16, 1260-1268 (2008)

[Non-Patent Document 4] D. S. Lipatov et. al., Optical Properties of Highly $Al_2O_3$ and $P_2O_5$ Doped Silica Hosts for Large Mode Area Fiber Lasers and Amplifiers, the proceedings of ECOC2007, Poster Session P020,

[Non-Patent Document 5] DiGIOVANNI et. al., Structure and properties of silica containing aluminum and phosphorus near the $AlPO_4$ join, Journal of Non-Crystalline Solids 113 (1989) 58-64.

However, in accordance with the method disclosed in Non-Patent Document 1, photodarkening can be reliably inhibited, but cannot fundamentally realize sufficient dehydration. For this reason, there is a problem in that the transmission loss caused by hydroxyl groups is great. Further, the method has the difficulty of increasing the size of preforms and of a low yield. Accordingly, the method is not good for reducing optical fiber manufacturing costs.

The method disclosed in Non-Patent Document 2 requires the addition of a large amount of aluminum in order to sufficiently inhibit photodarkening. As a result, there is a problem in that the refractive index of the optical fiber core increases. Optical fibers, to which rare-earth elements are added, used in fiber-type optical amplifiers or fiber lasers are generally used under the conditions of single mode transmission or a low number of modes of transmission. Accordingly, in a case where the refractive index of the core is high, it is necessary to make the diameter of the core relatively small. A small core diameter means that the effective core cross-sectional area ($A_{eff}$) of the optical fiber becomes small and thus the power density of the propagating light becomes high, whereby non-linear optical effects are liable to occur. That is, wavelength conversion occurs due to the non-linear optical effects and there is a problem in that the desired output light cannot be obtained.

The method disclosed in Non-Patent Document 3 requires the addition of a large amount of phosphorus in order to sufficiently inhibit photodarkening. However, since phosphorus is a dopant for increasing a refractive index, the refractive index of the core increases. Accordingly, when an attempt is made to transmit light in single mode transmission or a low number of modes of transmission using the optical fiber obtained by this method, there is a problem in that the non-linear optical effects mentioned above readily occur.

The refractive index of an optical fiber which contains aluminum and phosphorus and contains silica glass as a main component is reviewed in Non-Patent Document 4 and 5 in detail. However, the refractive index of an optical fiber which contains ytterbium, aluminum and phosphorus and contains silica glass as a main component is not reviewed in Non-Patent Document 4 and 5.

Meanwhile, it is known that optical fibers in which the cores contain ytterbium and other rare-earth elements are useful for application in fiber-type optical amplifiers or fiber lasers.

Patent Document 1 does not mention the inhibition of photodarkening. There is a concern that photodarkening cannot be sufficiently inhibited simply by adding the elements to the core in the concentration range mentioned in Patent Document 1.

The present invention has been made in view of the above problems and it is an object to provide ytterbium-doped optical fiber which inhibits photodarkening, as well as suppressing an increase of the refractive index of the core and thus is capable of inhibiting non-linear optical effects.

SUMMARY

The present invention adopts the followings approaches to solve the problems and thus accomplish the object (1) The ytterbium-doped optical fiber of the present invention includes a core containing at least ytterbium, aluminum and phosphorous and a clad surrounding the core, wherein a molar concentration of diphosphorus pentoxide with respect to phosphorus in the core is equal to a molar concentration of aluminum oxide with respect to aluminum in the core, wherein a ratio of a molar concentration of diphosphorus pentoxide with respect to phosphorus in the core to the molar concentration of ytterbium oxide with respect to ytterbium in the core is higher than or equal to 10 and lower than or equal to 30, and wherein a relative refractive index difference between the core and the clad is higher than or equal to 0.05% and lower than or equal to 0.30%.

(2) Preferably, the core and the clad are composed of a glass containing silica glass as a base.

(3) Preferably, assuming the molar concentration of ytterbium oxide in the core is a, a satisfies an equation of $0.05 \leq a \times 0.5 \leq 0.30$.

(4) The ytterbium-doped optical fiber of the present invention includes a core containing at least ytterbium, aluminum and phosphorous and a clad surrounding the core, wherein a ratio of a molar concentration of diphosphorus pentoxide with respect to phosphorus in the core to a molar concentration of ytterbium oxide with respect to ytterbium in the core is higher than or equal to 10 and lower than or equal to 30, wherein a relative refractive index difference between the core and the clad is higher than or equal to 0.05% and lower than or equal to 0.30%, and assuming the molar concentration of ytterbium oxide is $\alpha$, a molar concentration of aluminum oxide with respect to aluminum in the core is $\beta$, and the molar concentration of diphosphorus pentoxide is $\gamma$, $\alpha$, $\beta$ and $\gamma$ satisfy an equation of $0.05 \leq (\beta - \gamma) \times 0.19 + \alpha \times 0.5 \leq 0.30$ in a case where $\beta \geq \gamma$.

(5) In the case of (4), $\beta$ and $\gamma$ satisfy an equation of $1 < (\beta/\gamma) \leq 3$.

(6) The ytterbium-doped optical fiber of the present invention includes a core containing at least ytterbium, aluminum and phosphorous and a clad surrounding the core, wherein a ratio of a molar concentration of diphosphorus pentoxide with respect to phosphorus in the core to a molar concentration of ytterbium oxide with respect to ytterbium in the core is higher than or equal to 10 and lower than or equal to 30, wherein a relative refractive index difference between the core and the clad is higher than or equal to 0.05% and lower than or equal to 0.30%, and assuming the molar concentration of ytterbium oxide is $\alpha$, a molar concentration of aluminum oxide with respect to aluminum in the core is $\beta$, and the molar concentration of diphosphorus pentoxide is $\gamma$, $\alpha$, $\beta$ and $\gamma$ satisfy an equation of $0.05 \leq (\gamma - \beta) \times 0.04 + \alpha \times 0.5 \leq 0.30$, in a case where $\beta < \gamma$.

(7) Preferably, in the case of (6), $\beta$ and $\gamma$ satisfy an equation of $0.56 \leq (\beta/\gamma) < 1$.

(8) Preferably, in any one of (1), (4) and (6), the core does not contain germanium.

The ytterbium-doped optical fiber of the present invention includes a core containing at least ytterbium, aluminum and phosphorous and a clad surrounding the core, wherein a molar concentration of diphosphorus pentoxide with respect to phosphorus in the core is equal to a molar concentration of aluminum oxide with respect to aluminum in the core, wherein a ratio of the molar concentration of diphosphorus pentoxide with respect to phosphorus in the core to the molar concentration of ytterbium oxide with respect to ytterbium in the core is higher than or equal to 10 and lower than or equal to 30, wherein the relative refractive index difference between the core and the clad is higher than or equal to 0.05% and lower than or equal to 0.30%. For this reason, it is possible to realize an optical fiber capable of inhibiting photodarkening and background loss and at the same time, suppressing an increase in the refractive index of the core so that non-linear optical effects can be inhibited.

EMBODIMENTS FOR CARRYING OUT THE INVENTION

The best mode of ytterbium-doped optical fiber according to the present invention will be described.

This mode is described specifically to facilitate the understanding of the concept of the present invention in detail; however, the present invention is not limited thereto, unless it is specifically mentioned otherwise.

The concentration of an added component given in units of "mol %" herein refers to an average value in an optical fiber having a refraction distribution, unless it is specifically mentioned otherwise.

The term "core diameter" used herein refers to a "diameter having a relative refractive index difference of 1/e of the maximum relative refractive index difference of the core".

<Ytterbium-Doped Optical Fiber>

The ytterbium-doped optical fiber (hereinafter, simply referred to as an "Yb-doped optical fiber") of the present invention includes a core and a clad surrounding the core, wherein the core contains at least ytterbium (Yb), aluminum (Al) and phosphorous (P). Further, a ratio of a molar concentration of diphosphorus pentoxide ($P_2O_5$) with respect to phosphorus in the core (hereinafter, simply referred to as a "concentration of diphosphorus pentoxide") to a molar concentration of ytterbium oxide ($Yb_2O_3$) with respect to ytterbium in the core (hereinafter, simply referred to as "concentration of ytterbium oxide") is higher than or equal to 10 and lower than or equal to 30. The relative refractive index difference between the core and the clad is higher than or equal to 0.05% and lower than or equal to 0.30%.

Ytterbium is a dopant having a light amplification action.

Aluminum is a dopant having an increase action on refractive index and an inhibitory action on crystallization of silica glass.

Phosphorous is a dopant having photodarkening inhibitory action and an increase action on refractive index.

Phosphorous in the core has an inhibitory action on photodarkening. However, in a case where the refractive index of the core is a desired low value in an optical fiber in which the core contains only ytterbium and phosphorus, silica glasses are crystallized. For this reason, this optical fiber cannot be used as an optical fiber for light amplification. However, by further adding aluminum to the core, photodarkening can be inhibited and crystallization of silica glasses can be inhibited, even if the refractive index of the core is lowered to a desired level. The reason for the inhibitory action of aluminum in regard to the crystallization of silica glasses is considered to be because ytterbium and phosphorus are dispersed in silica glasses.

The present invention can prevent photodarkening by setting a ratio of a molar concentration of diphosphorus pentoxide ($P_2O_5$) with respect to phosphorus in the core to a molar concentration of ytterbium oxide ($Yb_2O_3$) with respect to ytterbium in the core within a specific range.

From the aforementioned viewpoints, the ratio of a molar concentration of diphosphorus pentoxide ($P_2O_5$) with respect to phosphorus in the core to a molar concentration of ytterbium oxide ($Yb_2O_3$) with respect to ytterbium in the core is preferably higher than or equal to 10 and lower than or equal to 30, more preferably higher than or equal to 15 and lower than or equal to 20.

When the molar concentration ratio is less than 10, the amount of loss increase due to photodarkening rapidly increases.

On the other hand, when the molar concentration ratio is higher than 30, the background loss value rapidly becomes large.

Generally, when the background loss value becomes large, in the case where the Yb-doped optical fiber is applied to a fiber laser, the fiber laser exhibits a deteriorated energy conversion efficiency.

Further, assuming the molar concentration of ytterbium oxide in the core is $\alpha$, the molar concentration of aluminum oxide with respect to aluminum in the core (hereinafter, simply referred to as "concentration of aluminum oxide") is $\beta$, and the molar concentration of diphosphorus pentoxide in the core is $\gamma$, $\beta=\gamma$. In this case, preferably, the equation of $0.05 \leq \alpha \times 0.5 \leq 0.30$ is satisfied, more preferably, the equation of $0.08 \leq \alpha \times 0.5 \leq 0.20$ is satisfied, and most preferably, the equation of $0.10 < \alpha \times 0.5 \leq 0.15$ is satisfied.

In the equations, "0.5" is a contribution ratio (variation ratio) in which 1 mol % ytterbium oxide contributes to an increase in the refractive index of the core.

Ytterbium oxide increases the refractive index of the core in proportion to the molar concentration. In this regard, aluminum oxide and diphosphorus pentoxide together offset an increase in the refractive index of core. Accordingly, in the case where the molar concentration ($\beta$) of aluminum oxide in the core is equal to the molar concentration ($\gamma$) of diphosphorus pentoxide in the core ($\beta=\gamma$), only ytterbium oxide varies the refractive index of the core.

Accordingly, when $\alpha$, $\beta$ and $\gamma$ satisfy the equation of $0.05 < \alpha \times 0.5 \leq 0.30$ in a case where $\beta=\gamma$, a great effect whereby photodarkening as well as crystallization of glasses can be efficiently inhibited can be obtained.

When $\alpha \times 0.5$ is lower than 0.05, that is, when the difference in refractive index between the core and the clad is lower than 0.05, bend loss or loss due to external stress to the optical fiber is great and is not practical. Meanwhile, when $\alpha \times 0.5$ is higher than 0.30, that is, when the difference in refractive index between the core and the clad is higher than 0.30, due to the exhibition of non-linear optical effects exemplified by stimulated Raman scattering, wavelength conversion is apt to occur and the desired output light cannot be obtained.

Further, assuming the molar concentration of ytterbium oxide in the core is $\alpha$, the molar concentration of aluminum oxide in the core is $\beta$, and the molar concentration of diphosphorus pentoxide in the core is $\gamma$, the equation of $\beta>\gamma$ is possible. In this case, preferably, the equation of $0.05 \leq (\beta-\gamma) \times 0.19 + \alpha \times 0.5 \leq 0.30$ is satisfied, and more preferably, the equation of $0.08 \leq (\beta-\gamma) \times 0.19 + \alpha \times 0.5 \leq 0.20$ is satisfied.

In the equations, "0.5" is a contribution ratio (variation ratio) in which 1 mol % ytterbium oxide contributes to an increase in the refractive index of the core and "0.19" is a contribution ratio (variation ratio) in which 1 mol % aluminum oxide contributes to an increase in the refractive index of the core.

In the case where the molar concentration ($\beta$) of aluminum oxide in the core is higher than the molar concentration ($\gamma$) of diphosphorus pentoxide in the core ($\beta>\gamma$), the refractive index of the core increases in proportion to the excess molar concentration of aluminum oxide. In addition, ytterbium oxide also increases the refractive index of the core. Accordingly, the increase in the refractive index of the core due to the excess aluminum oxide and ytterbium oxide satisfies an additive property.

Accordingly, when $\alpha$, $\beta$ and $\gamma$ satisfy the equation of $0.05 \leq (\beta-\gamma) \times 0.19 + \alpha \times 0.5 \leq 0.30$ in a case where $\beta > \gamma$, a great effect whereby photodarkening as well as crystallization of glasses can be efficiently inhibited can be obtained.

When $(\beta-\gamma) \times 0.19 + \alpha \times 0.5$ is lower than 0.05, that is, when the difference in refractive index between the core and the clad is lower than 0.05, bend loss or loss due to external stress to the optical fiber is great and is not practical. Meanwhile, when $(\beta-\gamma) \times 0.19 + \alpha \times 0.5$ is higher than 0.30, that is, when the difference in refractive index between the core and the clad is higher than 0.30, due to the exhibition of non-linear optical effects exemplified by stimulated Raman scattering, wavelength conversion is apt to occur and the desired output light cannot be obtained.

In this case, preferably, $\beta$ and $\gamma$ satisfy the equation of $1 < (\beta/\gamma) \leq 3$. When $\beta/\gamma$ is higher than 3, in some cases, the relative refractive index difference between the core and the clad is higher than 0.30. For this reason, the desired output light mentioned above cannot be obtained.

Further, assuming the molar concentration of ytterbium oxide in the core is $\alpha$, the molar concentration of aluminum oxide in the core is $\beta$, and the molar concentration of diphosphorus pentoxide in the core is $\gamma$, the equation of $\beta < \gamma$ is possible. In this case, preferably, the equation of $0.05 \leq (\gamma-\beta) \times 0.04 + \alpha \times 0.5 \leq 0.30$ is satisfied, and more preferably, the equation of $0.08 \leq (\gamma-\beta) \times 0.04 + \alpha \times 0.5 \leq 0.20$ is satisfied.

In the equations, "0.5" is a contribution ratio (variation ratio) in which 1 mol % ytterbium oxide contributes to an increase in the refractive index of the core and "0.04" is a contribution ratio (variation ratio) in which 1 mol % diphosphorus pentoxide contributes to an increase in the refractive index of the core.

In the case where the molar concentration ($\gamma$) of diphosphorus pentoxide in the core is higher than the molar concentration ($\beta$) of aluminum oxide in the core ($\beta < \gamma$), the refractive index of the core increases in proportion to the excess molar concentration of diphosphorus pentoxide. In addition, ytterbium oxide also increases the refractive index of the core. Accordingly, the increase in the refractive index of the core due to the excess diphosphorus pentoxide and ytterbium oxide satisfies an additive property.

Accordingly, when $\alpha$, $\beta$ and $\gamma$ satisfy the equation of $0.05 \leq (\gamma-\beta) \times 0.04 + \alpha \times 0.5 \leq 0.30$ in a case where $\beta < \gamma$, a great effect whereby photodarkening as well as crystallization of glasses can be efficiently inhibited can be obtained.

When $(\gamma-\beta) \times 0.04 + \alpha \times 0.5$ is lower than 0.05, that is, when the difference in refractive index between the core and the clad is lower than 0.05, bend loss or loss due to external stress to the optical fiber is great and is not practical. Meanwhile, when $(\gamma-\beta) \times 0.04 + \alpha \times 0.5$ is higher than 0.30, that is, when the difference in refractive index between the core and the clad is higher than 0.30, due to the exhibition of non-linear optical effects exemplified by stimulated Raman scattering, wavelength conversion is apt to occur and the desired output light cannot be obtained.

In this case, preferably, $\beta$ and $\gamma$ satisfy the equation of $0.56 \leq (\beta/\gamma) < 1$. When $\beta/\gamma$ is lower than 0.56, in some cases, the relative refractive index difference between the core and the clad may be higher than 0.30. For this reason, the desired output light mentioned above cannot be obtained.

Preferably, the core and the clad are made of a glass based on silica glass ($SiO_2$). The silica glass is generally used as an optical fiber for transmission, which can decrease transmission loss and is advantageous in amplifying light with high efficiency.

The distribution of refractive index of the core is not particularly limited and may be suitably controlled according to the intended purpose. The refractive index distribution of the core may be any known refractive index distribution such as a single-peaked step-type, a bell-shaped type, a concave-type, a dual shape, a segment core, a double concave-type, or a W-shape type.

The refractive index of the core and clad may be controlled taking into consideration the structure of the Yb-doped optical fiber, the desired relative refractive index difference or the like.

For example, it is preferable that the refractive index of the core is higher than the refractive index of the clad in order to store the guided light.

The relative refractive index difference between the core and the clad is preferably 0.05 to 0.30%, and more preferably 0.08 to 0.20%.

When the relative refractive index difference between the core and the clad is lower than 0.05%, a light storing effect of optical fibers cannot be sufficiently obtained. For this reason, when optical fibers are twisted or a lateral pressure is applied to optical fibers, light cannot be stably transmitted. Meanwhile, when the relative refractive index difference between the core and the clad is higher than 0.30%, in the case where optical fibers are substantially used in a single mode condition, or the optical fibers are used in a small number of modes, the diameter of the core decreases, and power density of light increases. For this reason, it is difficult to obtain inhibitory effects in respect to damage to core glass due to light or optical non-linear phenomena. For this reason, it is difficult to obtain a high power of output light.

The term "relative refractive index difference between the core and the clad" refers to a value calculated by the equation of $(n_1 - n_0)/n_1 \times 100$, assuming that the refractive index of the core is $n_1$ and the refractive index of the clad is $n_0$.

The diameter of core is preferably suitably determined depending on the refractive index of the core, and is generally preferably 10 to 40 μm, and more preferably 20 to 30 μm.

The Yb-doped optical fiber of the present invention may be prepared by a known method as long as a predetermined amount of ytterbium, aluminum and phosphorus are added to the core.

For example, the Yb-doped optical fiber may be prepared by manufacturing a fiber preform by an MCVD method, a VAD method or the like, drawing the preform to a desired outer diameter, and forming a protective coating layer with UV-curable resin or the like on the outer circumference. A double clad fiber may be prepared by coating the first UV coating layer with a resin having a lower refractive index than silica glass.

Ytterbium may be added to a soot by a solution doping method or spraying in the form of liquid droplets in the process of manufacturing the fiber preform.

Further, for example, in the case where the clad has a non-circular shape, the fiber preform after addition of ytterbium may be externally grinded to a desired shape and then drawn.

Further, for example, in the case where a stress-applied member is provided in the clad, holes are provided in the fiber preform after ytterbium addition, along the central axis, the internal surface thereof is made to be a mirror-surface by grinding and polishing, a stress-applying member made of $B_2O_3$—$SiO_2$ glass material is inserted thereto by an MCVD method, and then drawing may be performed.

According to the present invention, Yb-doped optical fiber which exhibits an excellent inhibitory effect on photodarkening and can obtain the desired high output light can be prepared by applying a known method such as MCVD method or VAD method. Further, the size of fiber preform used for the preparation is not limited. Accordingly, Yb-doped optical fibers which exhibit superior properties as mentioned above can be mass-produced at a low cost.

Further, by using such an optical fiber as a medium for light amplification, fiber lasers and fiber amps, in which deterioration in output with the passage of time is inhibited and which thus exhibit superior optical properties, can be provided at a low cost.

Hereinafter, the present invention will be described in more detail with reference to Experimental Examples, but the present invention is not limited to the Experimental Examples.

In the following Experimental Examples 1 to 9, basically, the core is made of silica glass containing ytterbium oxide ($Yb_2O_3$), aluminum oxide ($Al_2O_3$) and diphosphorus pentoxide ($P_2O_5$) and the clad is made of silica glass.

Experimental Example 1

Yb-doped optical fiber was prepared. The prepared Yb-doped optical fiber was a single clad fiber, which included a clad provided at the periphery of the core and a protective coating layer provided at the periphery of the clad.

The fiber preform was prepared by an MCVD method. Further, ytterbium was added by a solution doping method. In addition, the protective coating layer was provided at the periphery of the clad by drawing the fiber preform until the outer diameter of the glass was adjusted to be about 125 μm.

In the case where the molar concentration of ytterbium oxide ($Yb_2O_3$) in the core was maintained at 0.20 mol %, the molar concentration of aluminum oxide ($Al_2O_3$) in the core was maintained at 2.5 mol % and the molar concentration of diphosphorus pentoxide ($P_2O_5$) in the core was varied, the variation in relative refractive index difference (Δ) between the core and the clad for the Yb-doped optical fiber was obtained.

Figure 1:
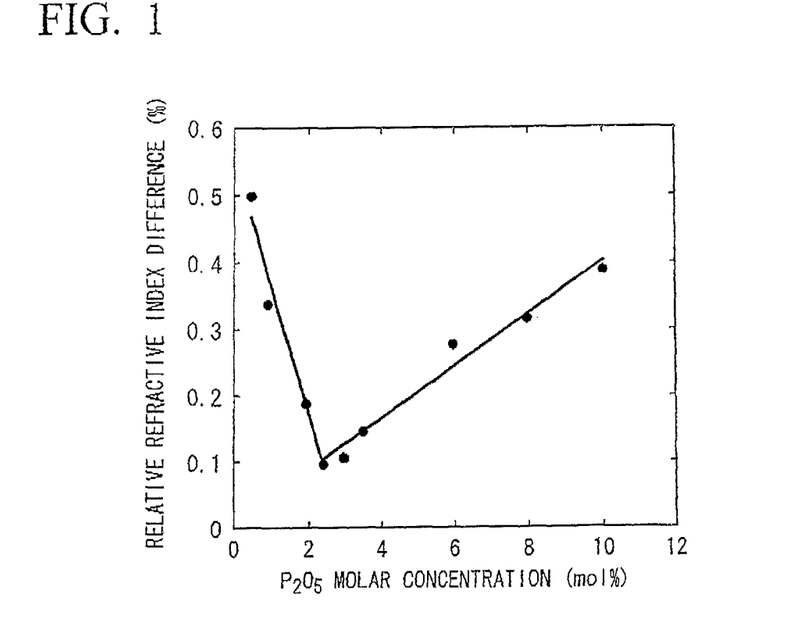
FIG. 1 is a graph showing correlation between the molar concentration of diphosphorus pentoxide in a core and the relative refractive index difference between the core and a clad for an Yb-doped optical fiber.

The results are shown in FIG. 1.

From the results shown in FIG. 1, it can be seen that, in the case where the molar concentration of diphosphorus pentoxide was about 2.5 mol %, which is substantially equal to the molar concentration of aluminum oxide, the relative refractive index difference between the core and the clad was a minimum. Further, in a region with a concentration higher than the molar concentration of diphosphorus pentoxide at which the relative refractive index difference was a minimum, the variation in relative refractive index difference was confirmed to approximate to a substantially straight line. Similarly, in a region with a concentration lower than the molar concentration of diphosphorus pentoxide at which the relative refractive index difference was a minimum, the variation in refractive index difference was also confirmed to be approximate to a substantially straight line. Further, the minimal relative refractive index difference was 0.10%. Further, in a region in which a relative excess of aluminum oxide was present in the core (in the case where the molar concentration of diphosphorus pentoxide was 2.5 mol % or less), the absolute value of a linear gradient representing the variation in relative refractive index difference was 0.190. Further, in a region in which a relative excess of diphosphorus pentoxide was present in the core (in the case where the molar concentration of diphosphorus pentoxide was 2.5 mol % or more), the absolute value of a linear gradient representing the variation in relative refractive index difference was 0.040.

These results are shown in Table 1.

Experimental Example 2

The variation (Δ) in relative refractive index difference between the core and the clad for the Yb-doped optical fiber was obtained, in the case where the molar concentration of diphosphorus pentoxide ($P_2O_5$) in the core was varied, in the same manner as in Experimental Example 1 except that the molar concentration of ytterbium oxide ($Yb_2O_3$) in the core was maintained at 0.10 mol % and the molar concentration of aluminum oxide ($Al_2O_3$) in the core was maintained at 2.5 mol %, and was then shown in the type of graph as FIG. 1 (not illustrated).

From these results, it can be seen that, in the case where the molar concentration of diphosphorus pentoxide was about 2.5 mol %, which is substantially equal to the molar concentration of aluminum oxide, the relative refractive index difference between the core and the clad was a minimum. Further, in a region with a concentration higher than the molar concentration of diphosphorus pentoxide at which the relative refractive index difference was a minimum, the variation in relative refractive index difference was confirmed to approximate to a substantially straight line. Similarly, in a region with a concentration lower than the molar concentration of diphosphorus pentoxide at which the relative refractive index difference was a minimum, the variation in relative refractive index difference was also confirmed to approximate a substantially line. Further, the minimal relative refractive index difference was 0.06%. Further, in a region in which a relative excess of aluminum oxide was present in the core (in the case where the molar concentration of diphosphorus pentoxide was 2.5 mol % or less), the absolute value of a linear gradient representing the variation in relative refractive index difference was 0.186. Further, in a region in which a relative excess of diphosphorus pentoxide was present in the core (in the case where the molar concentration of diphosphorus pentoxide was 2.5 mol % or more), the absolute value of a linear gradient representing the variation in refractive index difference was 0.041.

These results are shown in Table 1.

Experimental Example 3

The variation (Δ) in relative refractive index difference between the core and the clad for the Yb-doped optical fiber was obtained, in the case where the molar concentration of diphosphorus pentoxide ($P_2O_5$) in the core was varied, in the same manner as in Experimental Example 1 except that the molar concentration of ytterbium oxide ($Yb_2O_3$) in the core was maintained at 0.40 mol % and the molar concentration of aluminum oxide ($Al_2O_3$) in the core was maintained at 5.0 mol %, and was then shown in the type of graph as FIG. 1 (not illustrated).

From these results, it can be seen that, in the case where the molar concentration of diphosphorus pentoxide was about 5.0 mol %, which is substantially equal to the molar concentration of aluminum oxide, the relative refractive index difference between the core and the clad was a minimum. Further, in a region with a concentration higher than the molar concentration of diphosphorus pentoxide at which the relative refractive index difference was a minimum, the variation in relative refractive index difference was confirmed to approximate a substantially straight line. Similarly, in a region with a concentration lower than the molar concentration of diphosphorus pentoxide at which the relative refractive index difference was a minimum, the variation in refractive index difference also proved to approximate to a substantially straight line. Further, the minimal relative refractive index difference was 0.23%. Further, in a region in which a relative excess of aluminum oxide was present in the core (in the case where the molar concentration of diphosphorus pentoxide was 5.0 mol % or less), the absolute value of a linear gradient representing the variation in relative refractive index difference was 0.190. Further, in a region in which a relative excess of diphosphorus pentoxide was present in the core (in the case where the molar concentration of diphosphorus pentoxide was 5.0 mol % or more), the absolute value of a linear gradient representing the variation in relative refractive index difference was 0.042.

These results are shown in Table 1.

Experimental Example 4

The variation (Δ) in relative refractive index difference between the core and the clad for the Yb-doped optical fiber was obtained, in the case where the molar concentration of diphosphorus pentoxide ($P_2O_5$) in the core was varied, in the same manner as in Experimental Example 1 except that the molar concentration of ytterbium oxide ($Yb_2O_3$) in the core was maintained at 0.70 mol % and the molar concentration of aluminum oxide ($Al_2O_3$) in the core was maintained at 5.0 mol %, and was then shown in the type of graph as FIG. 1 (not illustrated).

From these results, it can be seen that, in the case where the molar concentration of diphosphorus pentoxide was about 5.0 mol %, which is substantially equal to the molar concentration of aluminum oxide, the relative refractive index difference between the core and the clad was a minimum. Further, in a region with a concentration higher than the molar concentration of diphosphorus pentoxide at which the relative refractive index difference was a minimum, the variation in relative refractive index difference was confirmed to approximate a substantially straight line. Similarly, in a region with a concentration lower than the molar concentration of diphosphorus pentoxide at which the relative refractive index difference was a minimum, the variation in relative refractive index difference was also confirmed to approximate a substantially straight line. Further, the minimal relative refractive index difference was 0.35%. Further, in a region in which a relative excess of aluminum oxide was present in the core (in the case where the molar concentration of diphosphorus pentoxide was 5.0 mol % or less), the absolute value of a linear gradient representing the variation in refractive index difference was 0.193. Further, in a region in which a relative excess of diphosphorus pentoxide was present in the core (in the case where the molar concentration of diphosphorus pentoxide is 5.0 mol % or more), the absolute value of a linear gradient representing the variation in relative refractive index difference was 0.037.

These results are shown in Table 1.

TABLE 1

|  | Experimental Example 1 | Experimental Example 2 | Experimental Example 3 | Experimental Example 4 | Experimental Example 10 | Average |
|---|---|---|---|---|---|---|
| Molar concentration of $Yb_2O_3$ (mol %) | 0.20 | 0.10 | 0.40 | 0.70 | 0.20 | — |
| Molar concentration of $Al_2O_3$ (mol %) | 2.5 | 2.5 | 5.0 | 5.0 | 2.5 | — |
| Molar concentration of $GeO_2$ (mol %) | — | — | — | — | 1.0 | — |
| Minimum relative refractive index difference (%) | 0.10 | 0.06 | 0.23 | 0.35 | 0.20 | — |
| Absolute value of a linear gradient representing the variation in refractive index of a region in which a relative excess of aluminum is present in the core | 0.190 | 0.186 | 0.190 | 0.193 | 0.192 | 0.190 |
| Absolute value of a linear gradient representing the variation in refractive index of a region in which a relative excess of phosphorus is present in the core | 0.040 | 0.041 | 0.042 | 0.037 | 0.040 | 0.040 |

From the results shown in Table 1, it can be seen that, when the molar concentration of diphosphorus pentoxide is substantially equal to the molar concentration of aluminum oxide, the relative refractive index difference between the core and the clad was a minimum. Further, it can be seen that when the molar concentration of aluminum oxide or molar concentration of diphosphorus pentoxide is relatively in excess in the core, the relative refractive index difference between the core and the clad increases. At this time, it can be seen that, when a ratio of the concentration of diphosphorus pentoxide in the core to the concentration of aluminum oxide in the core is higher than 1 and is lower than or equal to 3, in this optical fiber, the relative refractive index difference between the core and the clad is higher than or equal to 0.1 and lower than or equal to 0.3. Further, when a ratio of the concentration of diphosphorus pentoxide in the core to the concentration of aluminum oxide in the core is higher than or equal to 0.56 and is lower than 1, in this optical fiber, the relative refractive index difference between the core and the clad is higher than or equal to 0.1 and is lower than or equal to 0.3.

Further, an average of the absolute value of a linear gradient representing the variation in relative refractive index of a region in which a relative excess of aluminum oxide was present in the core obtained in Experimental Examples 1 to 4 was 0.19. Further, an average of the absolute value of a linear gradient representing the variation in relative refractive index of a region in which a relative excess of diphosphorus pentoxide was present in the core obtained in Experimental Examples 1 to 4 was 0.04. As can be seen from these results, when the linear gradient values thereof are converted per 1 mol %, a contribution ratio (variation ratio) in which a relative excess of aluminum oxide present in the core contributes to the relative refractive index difference between the core and the clad is 0.19%/mol % and a contribution ratio (variation ratio) in which a relative excess of diphosphorus pentoxide present in the core contributes to the relative refractive index difference between the core and the clad is 0.04%/mol %.

Figure 2:
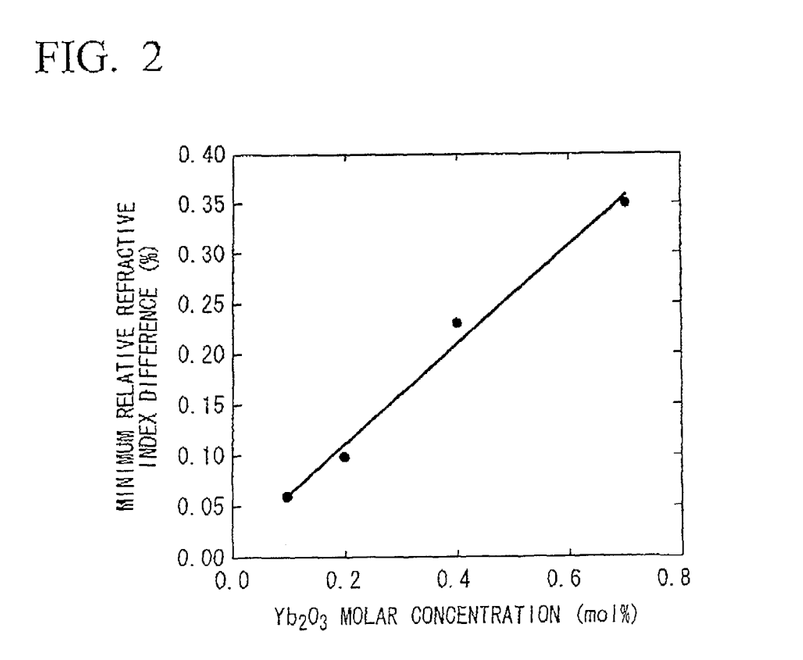
FIG. 2 is a graph showing correlation between the molar concentration of ytterbium oxide and the relative refractive index difference between the core and the clad for an Yb-doped optical fiber.

FIG. 2 is a graph showing correlation between the molar concentration of ytterbium oxide and the relative refractive index difference between the core and the clad, based on the results shown in Table 1.

The graph shown in FIG. 2 could be fitted as a straight line which passed through a zero point and the linear gradient thereof was 0.5%/mol %. Accordingly, when this value is converted per 1 mol %, a contribution ratio (variation ratio) in which ytterbium oxide contributes to the relative refractive index difference between the core and the clad is 0.5%/mol %.

Further, the graph shown in FIG. 2 shows correlation between the molar concentration of ytterbium oxide and the relative refractive index difference between the core and the clad, in the case where the molar concentration of aluminum oxide is 2.5 mol % (Experimental Examples 1 and 2) or 5.0 mol % (Experimental Examples 3 and 4). As can be seen from FIG. 2, the fact the relative refractive index difference as a function of two different molar concentrations of aluminum oxide can be plotted on a substantially equal straight line demonstrates that the contribution of the molar concentration of ytterbium oxide to the relative refractive index difference is independent of the molar concentration of aluminum oxide or the molar concentration of diphosphorus pentoxide.

The findings obtained from Experimental Examples 1 to 4 are given below.

For an Yb-doped optical fiber which contains ytterbium, aluminum and phosphorus in the core and is made of silica glass as a main component, in the case where the molar concentration of diphosphorus pentoxide is substantially equal to the molar concentration of aluminum oxide, the refractive index of the core approximates the refractive index of silica glass.

Further, a contribution ratio (variation ratio) in which a relative excess of aluminum oxide present in the core contributes to the relative refractive index difference between the core and the clad is 0.19%/mol %. A contribution ratio (variation ratio) in which a relative excess of diphosphorus pentoxide present in the core contributes to the relative refractive index difference between the core and the clad is 0.04%/mol %.

Further, the molar concentration of ytterbium oxide contributes to variation in the refractive index of the core, independent of the molar concentration of aluminum oxide or the molar concentration of diphosphorus pentoxide. A contribution ratio (variation ratio) of the molar concentration of ytterbium oxide to the refractive index of the core is 0.5%/mol %.

Experimental Example 5

Several types of Yb-doped optical fibers were prepared in the same manner as in Experimental Example 1 except that the molar concentration of ytterbium oxide in the core, the molar concentration of aluminum oxide in the core, and the molar concentration of diphosphorus pentoxide in the core was varied.

A loss increase amount caused by photodarkening was evaluated for the manufactured Yb-doped optical fibers by the following method.

(Method for Evaluating Loss Increase Amount Caused by Photodarkening)

An Yb-doped optical fiber having a length in the central axis direction in which the Yb absorbance amount of the core was 340 dB was used and excited light of a wavelength of 976 nm was irradiated to the core in an incident light amount of 400 mW for 100 minutes. Then, loss difference between after and before irradiation at a wavelength of 800 nm was defined as "loss increase amount due to photodarkening".

Figure 3:
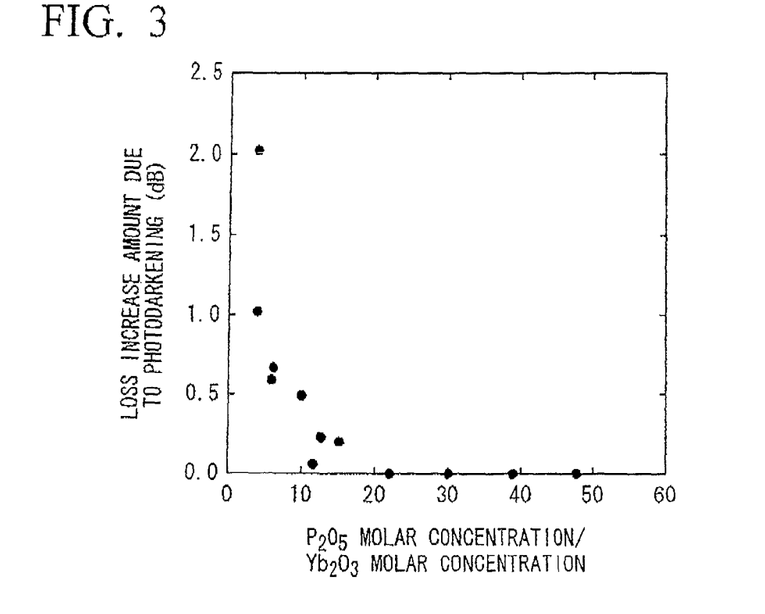
FIG. 3 is a graph showing correlation between a ratio of the molar concentration of diphosphorus pentoxide in the core to the molar concentration of ytterbium oxide in the core of an Yb-doped optical fiber and a loss increase amount due to photodarkening.

FIG. 3 is a graph showing correlation between a ratio of the molar concentration of diphosphorus pentoxide in the core to the molar concentration of ytterbium oxide in the core of the Yb-doped optical fiber and the loss increase amount due to photodarkening.

It can be seen from the results shown in FIG. 3 that the loss increase amount due to photodarkening greatly depends on the ratio of the molar concentration of diphosphorus pentoxide in the core to the molar concentration of ytterbium oxide in the core. When the ratio of molar concentration is higher than or equal to 10, the loss increase amount due to photodarkening can be controlled to be 0.5 dB or less, which indicates that photodarkening can be sufficiently inhibited. Meanwhile, when the ratio of molar concentration is less than 10, the loss increase amount due to photodarkening exceeds 0.5 dB, For this reason, in the case where fiber lasers using such an Yb-doped optical fiber are operated for a long period of time, output deteriorates, thus causing problems in regard to reliability.

Further, it was confirmed from the results shown in FIG. 3 that, as the ratio of molar concentration increases, the loss increase amount due to photodarkening decreases (to a level of approximately zero). In addition, it was confirmed that, when the ratio of molar concentration is less than 10, the loss increase amount due to photodarkening rapidly increases.

As can be seen from FIG. 3, the loss increase amount due to photodarkening is approximately zero, when the ratio of molar concentration is 20 or higher. It is preferable that the loss increase amount due to photodarkening is ideally zero. However, a loss increase of about 0.5 dB is a level which substantially approximates to zero and causes no problems in terms of practical application. Further, when the ratio of molar concentration is 20 or higher, the loss increase amount due to photodarkening is approximately zero, but the molar concentration of diphosphorus pentoxide increases. In this case, in the process of manufacturing optical fiber preforms, the preforms are apt to crack. Accordingly, it is difficult to uniformly distribute the concentration of diphosphorus pentoxide in the core. As a result, it is difficult to manufacture large size preforms and it is disadvantageous for the realization of low manufacturing costs.

It can be concluded from the foregoing results that, an Yb-doped optical fiber, in which the loss increase amount due to photodarkening is 0.5 dB or less, that is, a ratio of the molar concentration of diphosphorus pentoxide in the core to the molar concentration of ytterbium oxide in the core is 10 or higher, has substantially no problems.

Experimental Example 6

Loss wavelength properties at a wavelength of 1200 nm were evaluated for the Yb-doped optical fiber prepared in Experimental Example 5.

Figure 4:
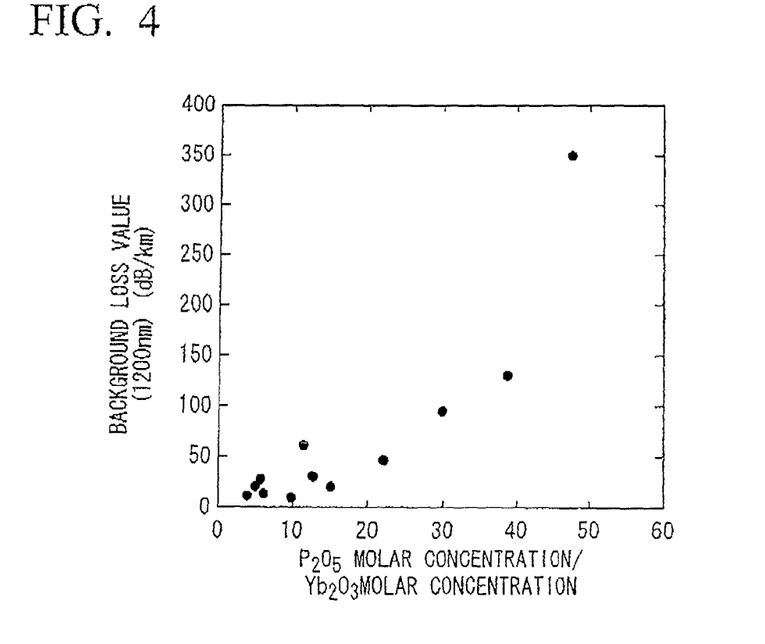
FIG. 4 is a graph showing correlation between a ratio of the molar concentration of diphosphorus pentoxide in the core of Yb-doped optical fibers to the molar concentration of ytterbium oxide in the core and a background loss value at a wavelength of 1200 nm.

FIG. 4 is a graph showing correlation between a ratio of the molar concentration of diphosphorus pentoxide in the core to the molar concentration of ytterbium oxide in the core for Yb-doped optical fibers and a background loss value at a wavelength of 1200 nm.

It can be seen from the results shown in FIG. 4 that the background loss value greatly depends on the ratio of the molar concentration of diphosphorus pentoxide in the core to the molar concentration of ytterbium oxide in the core. When the ratio of molar concentration is 30 or less, the background loss value is 100 dB/km or less, which indicates that the background loss value can be sufficiently decreased. Meanwhile, when the ratio of molar concentration is higher than 30, the background loss value exceeds 100 dB/km. For this reason, in the case where an Yb-doped optical fiber is applied to fiber lasers, energy conversion efficiency of fiber lasers is significantly deteriorated.

Further, it was proved from the results shown in FIG. 4 that when the ratio of molar concentration exceeds 30, the background loss value rapidly increases. It is generally known that, when the background loss value increases, in the case where Yb-doped optical fibers are applied to fiber lasers, the fiber lasers are deteriorated in energy conversion efficiency. Accordingly, it is preferable that the background loss value should be made as low as possible. However, it can be seen that practical application is possible when the background loss value is lower than a certain level.

Accordingly, there is no practical problem in an Yb-doped optical fiber, in a region in which a ratio of the molar concentration of diphosphorus pentoxide in the core to the molar concentration of ytterbium oxide in the core is 30 or less (a critical point at which the background loss value rapidly varies), that is, in which the background loss value is 100 dB/km (at a wavelength of 1200 nm) or less.

Experimental Example 7

The present invention is based on the discovery that an Yb-doped optical fiber, which includes a core containing ytterbium, aluminum and phosphorus and is made of silica glass as a main component, inhibits photodarkening, suppresses an increase in the refractive index of the core, thus inhibiting non-linear optical effects.

Although the photodarkening and non-linear optical effects can be ideally completely inhibited, that is, these phenomena are zero, complete inhibition thereof is practically impossible. Further, to completely inhibit photodarkening and non-linear optical effects, the configurations of the manufacturing apparatus are complicated, creating the problem of an increase in manufacturing costs. Accordingly, the inhibition of photodarkening and non-linear optical effects to a level which is acceptable to some extent as industrial products is a practical measure. Accordingly, according to the present invention, a practical value is set as a "desired value".

For the desired value in the inhibition of photodarkening, the loss increase amount due to photodarkening is set to 0.5 dB or less.

For the desired value in inhibition of non-linear optical effects, the relative refractive index difference between the core and the clad is set to a level higher than or equal to 0.05% and lower than or equal to 0.30%.

The reason for setting the desired value of the loss increase amount due to photodarkening to 0.5 dB or less is that in the case where fiber lasers using optical fibers satisfying the desired value are continuously operated for 1000 hours or longer, the power of output light after 1000 hours is 70% or higher of the initial power of output light. The requirement specifications for output deterioration depend on the products or users and are defined as a level acceptable as industrial products, when 70% or more of the initial output is maintained at 1000 hours after operation is initiated.

The reason for setting the desired value of the relative refractive index difference between the core and the clad to a level higher than or equal to 0.05% and lower than or equal to 0.30% in the inhibition of non-linear optical effects is that fiber lasers using optical fibers satisfying the desired value exhibit superior power and beam qualities of output light.

It is generally known that, in the case where the relative refractive index difference between the core and the clad is excessively low, for example, the relative refractive index difference is less than 0.05%, a light storing effect is low. For this reason, the light transmission conditions are unstable due to external stress caused by bending of the optical fibers or application of lateral pressure to the optical fibers or stress due to temperature variation accompanying volume variation and are thus considered to be impractical.

In the case where the relative refractive index difference between the core and the clad is excessively large, for example, the relative refractive index difference is 0.30% or higher, the active core cross-sectional area ($A_{eff}$) decreases and influence on non-linear optical effects thus increases. For example, stimulated Raman scattering, which is one kind of non-linear optical effect, frequently occurs, the spectrum width of laser output light widens, thus resulting in deterioration in beam qualities or deterioration in output due to Raman light generation efficiency in some cases. In order to inhibit deterioration in beam qualities, a method for cutting stimulated Raman-scattering light which appears at a longer wavelength than laser output light using a wavelength filter arranged at an outlet of an optical fiber for amplification may be used in some cases. In this case, stimulated Raman-scattering light is finally cut with the wavelength filter and output light power cannot be sufficiently obtained. Further, in the case where it is intended to obtain high output from systems accepting non-linear optical effects, a phenomenon, in which an optical fiber as an amplification medium is broken due to optical damage, occurs. The optical damage threshold greatly depends on the power density of light. Accordingly, in order to prevent breakage, an active core cross-sectional area needs to be maintained to be as high as possible, that is, the relative refractive index difference between the core and the clad needs to be maintained to be as low as possible.

Experimental Example 8

A variety of Yb-doped optical fibers were manufactured in the same manner as in Experimental Example 1 except that the relative refractive index difference between the core and the clad was varied by finely adjusting the molar concentration of these dopants within a range such that the molar concentration of ytterbium oxide in the core, molar concentration of diphosphorus pentoxide in the core and the molar concentration of aluminum oxide in the core were not greatly varied.

In the case where optical fibers having a small relative refractive index difference were prepared, a suitable amount of fluorine having a deterioration effect on the refractive index was added to adjust the relative refractive index difference.

The Yb-doped optical fiber used in Experimental Example 8 was a double clad fiber in which a core had a diameter of 30 μm and a step profile, a clad had a diameter of 400 μm, the periphery of the clad was coated with a resin having a low refractive index, and the periphery thereof was further coated with a resin having a high refractive index.

The double clad fiber used as an optical fiber for amplification was wound using its entire length on a cylindrical member having a diameter of 300 mm.

A pulse longitudinal beam with a wavelength of 1060 nm and an average power of 1 W was irradiated to the core of optical fiber for amplification wound on the cylindrical member. Further, excited light with a wavelength of 915 nm and a power of 50 W was irradiated to the clad to amplify light with a wavelength of 1060 nm.

In addition, output light power of the light with a wavelength of 1060 nm amplified by the optical fiber for amplification was measured.

Here, output light power in a wavelength range of 1060 nm (including stimulated Raman scattering light) emitted from the optical fiber for amplification was measured without using any wavelength filter. The length of optical fiber for amplification was suitably adjusted in order to maximize the output light power.

Figure 5:
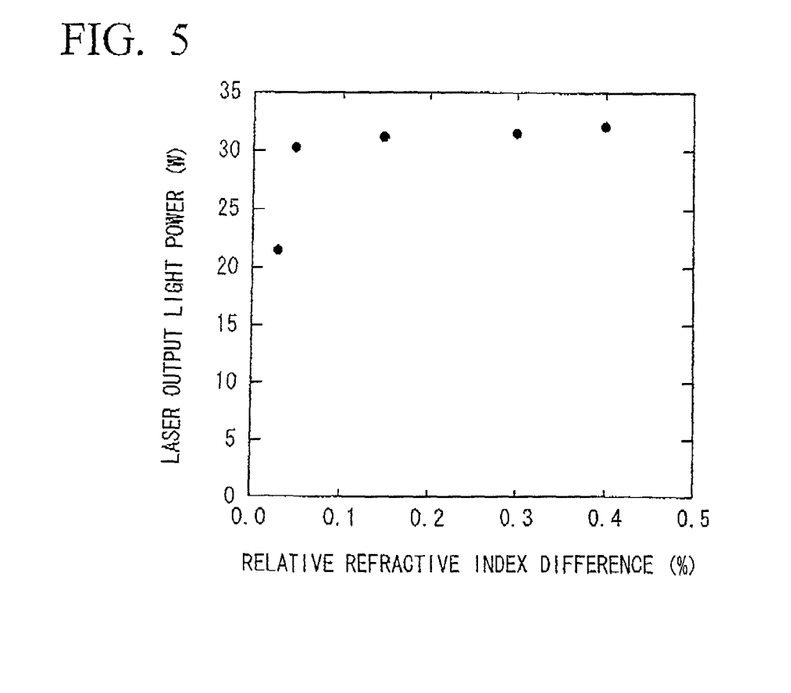
FIG. 5 is a graph showing correlation between the relative refractive index difference between the core and the clad of optical fiber for amplification and the laser output light power.

The correlation between the relative refractive index difference between the core and the clad of optical fiber for amplification and the laser output light power, obtained by this measurement is shown in FIG. 5. In the graph shown in FIG. 5, a horizontal axis represents a relative refractive index difference between the core and the clad of the optical fiber for amplification, and a vertical axis represents a laser output light power at the outlet of the optical fiber for amplification.

It can be seen from the results shown in FIG. 5 that when the relative refractive index difference between the core and the clad is 0.05% or higher, output light power becomes 30 W or higher and a practical level of energy conversion efficiency can be obtained. Meanwhile, it can be seen that when the relative refractive index difference between the core and the clad is less than 0.05%, light storing effect is low, bend loss increases and the obtained output light power significantly decreases. When the optical fiber for amplification has a winding diameter higher than 300 mm, a decrease in bend loss can be expected, but miniaturization of fiber laser apparatuses cannot be realized. For this reason, it is not preferable to further increase the winding diameter. When taking into consideration only the bend loss, as the relative refractive index difference between the core and the clad increases, the bend loss is decreased and the winding diameter is thus decreased, thus being advantageous in miniaturization of fiber laser apparatuses.

As apparent from the foregoing, according to the present invention, it is appropriate that the desired level of the relative refractive index difference between the core and the clad is set to 0.05% or higher.

Experimental Example 9

A variety of Yb-doped optical fibers were manufactured in the same manner as in Experimental Example 1 except that the relative refractive index difference between the core and the clad was varied by finely adjusting the molar concentration of diphosphorus pentoxide and the molar concentration of aluminum oxide, within a range such that the molar concentration of ytterbium oxide in the core, molar concentration of diphosphorus pentoxide in the core and the molar concentration of aluminum oxide in the core were not greatly varied.

The Yb-doped optical fiber used in Experimental Example 9 was a double clad fiber in which a core had a diameter of 30 µm and a step profile, a clad had a diameter of 400 µm, the periphery of the clad was coated with a resin having a low refractive index, and the periphery thereof was further coated with a resin having a high refractive index.

Using the double clad fiber as an optical fiber for amplification, a pulse longitudinal beam with a wavelength of 1060 nm and an average power of 1 W was irradiated to the core of the optical fiber for amplification wound on the cylindrical member. Further, excited light with a wavelength of 915 nm and a power of 50 W was irradiated to the clad to amplify light with a wavelength of 1060 nm.

A wavelength filter for cutting light having a wavelength of 1100 nm or higher was arranged at an outlet of an optical fiber for amplification.

In the case where output light at a wavelength of about 1060 nm is amplified, primarily stimulated Raman-scattering light occurs at a wavelength of about 1110 nm.

Further, secondarily stimulated Raman-scattered light occurs at a wavelength of about 1160 nm. The reason for cutting light higher than or equal to a wavelength of 1100 nm is that stimulated Raman scattering light is inhibited and deterioration in beam qualities is thus inhibited.

In such a system, a fiber laser apparatus was manufactured using optical fibers for amplification having different relative refractive index differences between the core and the clad and the laser output light power after passing through the wavelength filter was then measured. The length of the optical fiber for amplification was suitably adjusted in order to maximize the output light power.

Figure 6:
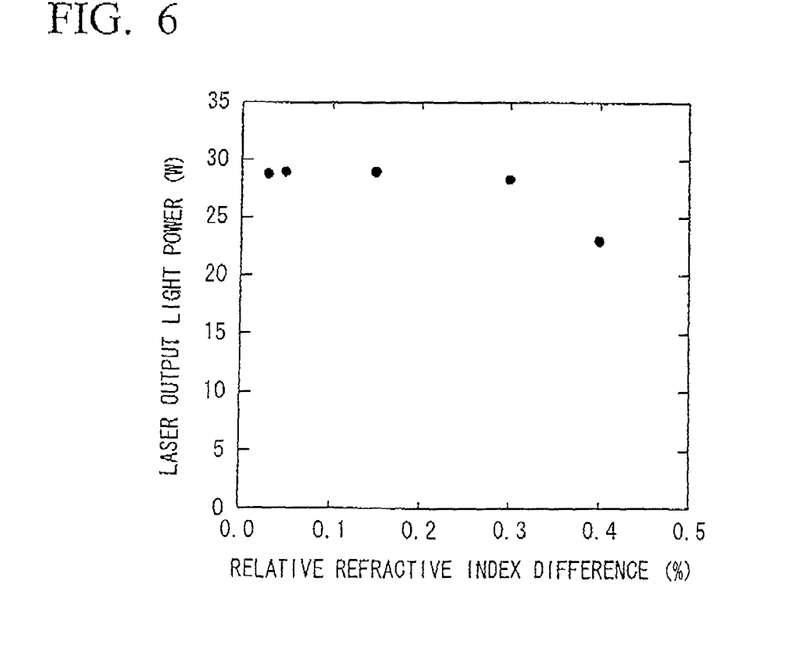
FIG. 6 is a graph showing correlation between the relative refractive index difference between the core and the clad of an optical fiber for amplification and the laser output light power.

The correlation between the relative refractive index difference between the core and the clad of optical fiber for amplification and the laser output light power, obtained by this measurement, is shown in FIG. 6. In the graph shown in FIG. 6, a horizontal axis represents a relative refractive index difference between the core and the clad of the optical fiber for amplification, and a vertical axis represents the laser power of the output light passing through the wavelength filter.

It can be seen from the results shown in FIG. 6 that when the relative refractive index difference between the core and the clad is 0.30% or less, the output power becomes 25 W or higher and a practical level of energy conversion efficiency can be obtained.

Meanwhile, when the relative refractive index difference between the core and the clad is higher than 0.30%, generation of stimulated Raman-scattering light increases and the obtainable output light power thus significantly decreases. The output light power obtained in Experimental Example 9 is slightly lower than the output light power obtained in Experimental Example 8. This is considered to be due to the fact that the wavelength filter arranged at the outlet of the optical fiber for amplification was influenced by the loss. Accordingly, it is clear that the output light power can be increased by adjusting the relative refractive index difference between the core and the clad of the optical fiber for amplification to 0.30% or less.

As such, in the present invention, it is reasonable that the desired level of the relative refractive index difference between the core and the clad is set to 0.30% or less.

Experimental Example 10

An Yb-doped optical fiber, in which ytterbium, aluminum, phosphorus and germanium are present in the core, was prepared.

The Yb-doped optical fiber was prepared in the same manner as in Experimental Example 1 except that germanium dioxide ($GeO_2$) was added in an amount of 1 mol %. Further, variation in the relative refractive index difference between the core and the clad of the Yb-doped optical fiber was obtained in the same manner as in Experimental Example 1 under the conditions that the molar concentration of ytterbium oxide in the core was maintained at 0.20 mol %, the molar concentration of aluminum oxide in the core was maintained at 2.5 mol % and the molar concentration of diphosphorus pentoxide in the core was varied. The results thus obtained are shown in Table 1 and FIG. 7.

Figure 7:
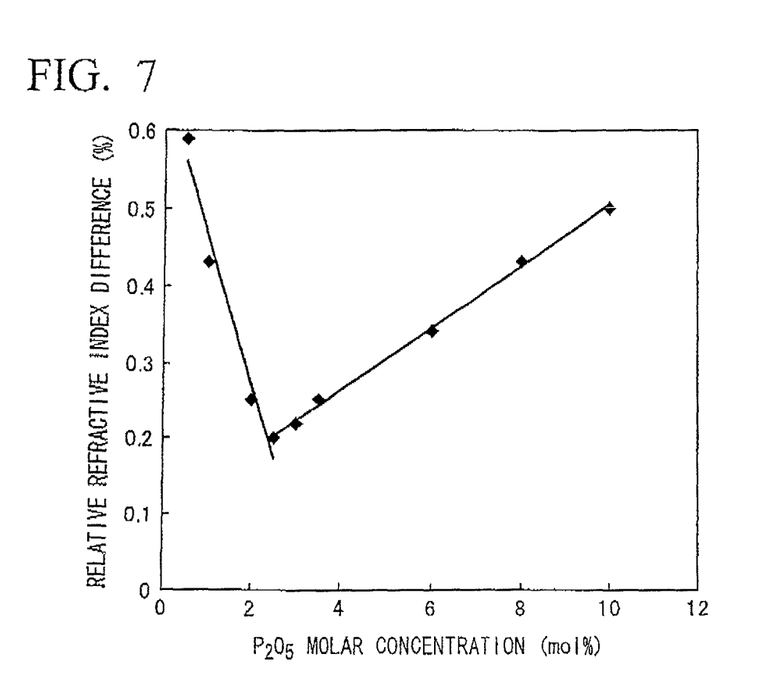
FIG. 7 is a graph showing correlation between the molar concentration of diphosphorus pentoxide in the core and the relative refractive index difference between the core and the clad for an Yb-doped optical fiber to which germanium is further added to the core.

As can be seen from FIG. 7, in the case where the molar concentration of diphosphorus pentoxide was about 2.5 mol %, which is substantially equal to the molar concentration of aluminum oxide, the relative refractive index difference between the core and the clad was a minimum. Further, in a region with a concentration lower than and a region with a concentration higher than the molar concentration of diphosphorus pentoxide at which the relative refractive index difference was minimized, the variation in relative refractive index difference was confirmed to approximate to a substantially straight line. The absolute values of the gradients were 0.192 and 0.040, respectively. These gradients are substantially equal to the results obtained in Experimental Examples 1 to 4. Experimental Example 10 is different from Experimental Example 1 in that the minimum relative refractive index difference was 010%, which is higher than the minimum relative refractive index difference of Experimental Example 1. This is due to the fact that the refractive index of the core is increased by the inclusion of germanium dioxide in the core.

It is generally known that germanium-containing silica glass undergoes about a 0.1% increase in refractive index in the case of about 1 mol % of germanium dioxide. Comparing the results shown in FIG. 7 with the results shown in FIG. 1, the relative refractive index difference increases to about 0.1% under any condition of the concentration of diphosphorus pentoxide. This is considered to be due to the fact that the refractive index increases to a generally known level by the inclusion of germanium.

As mentioned above, it is preferable that the relative refractive index difference between the core and the clad is 0.30% or less. As can be seen from the results shown in FIG. 1, the molar concentration of diphosphorus pentoxide allowing the relative refractive index difference to be 0.30% or less falls within a wide range of 1.5 to 7.5 mol %. Meanwhile, as can be seen the results shown in FIG. 7, the molar concentration falls within a narrow range of 1.8 to 5.0 mol %. Accordingly, it is preferable that germanium is not present in the core from the viewpoint of a relative refractive index difference.

Loss increase amount due to photodarkening was evaluated in the same manner as in Experimental Example 5 using an optical fiber obtained in Experimental Example 10. As a result, it was confirmed that the loss increase amount due to photodarkening is independent of the presence of germanium dioxide and is not greatly varied.

As apparent from the foregoing, it is preferable that germanium dioxide is not added in a great amount, in the case where there is no specific purpose behind the addition of the germanium dioxide, such as in an application of a grating. The reason is that, as mentioned above, power and beam qualities of output light of fiber lasers are deteriorated, since the addition of germanium dioxide is accompanied by an increase in the refractive index, although it has no specific influence on photodarkening. Similarly, it is preferable that refractive index increasing agents (such as Ti) other than Al and P are not included as much as possible, when effects of the elements added are specifically not accepted.

In brief, from the results of Experimental Examples 1 to 10, it can be concluded that optical fibers which can inhibit photodarkening and non-linear optical effects are considered to be practical when they satisfy the requirements that the loss increase amount due to photodarkening is 0.5 dB or less and that the relative refractive index difference between the core and the clad is higher than or equal to 0.05% and lower than or equal to 0.30%. At this time, it is preferable that the core does not contain a dopant for increasing the refractive index such as germanium.

The invention claimed is:

1. An ytterbium-doped optical fiber comprising a core containing at least ytterbium, aluminum and phosphorous and a clad surrounding the core,
   wherein a molar concentration of diphosphorus pentoxide with respect to phosphorus in the core is equal to a molar concentration of aluminum oxide with respect to aluminum in the core,
   wherein a ratio of a molar concentration of diphosphorus pentoxide with respect to phosphorus in the core to a molar concentration of ytterbium oxide with respect to ytterbium in the core is 10 to 30,
   wherein a relative refractive index difference between the core and the clad is 0.05 to 0.30%,
   wherein the molar concentration of ytterbium oxide in the core ($\alpha$) is within the range $0.05 \leq \alpha \times 0.5 \leq 0.30$,
   wherein a diameter of the core is 20 to 30 µm, and
   wherein the core does not contain germanium.

2. The ytterbium-doped optical fiber according to claim 1, wherein the core and the clad are composed of a glass containing silica glass as a base.

3. An ytterbium-doped optical fiber comprising a core containing at least ytterbium, aluminum and phosphorous and a clad surrounding the core,
   wherein a ratio of a molar concentration of diphosphorus pentoxide with respect to phosphorus in the core to a molar concentration of ytterbium oxide with respect to ytterbium in the core is 10 to 30,
   wherein a relative refractive index difference between the core and the clad is 0.05% to 0.30%,
   wherein the molar concentration of ytterbium oxide ($\alpha$), a molar concentration of aluminum oxide with respect to aluminum in the core ($\beta$), and the molar concentration of diphosphorus pentoxide ($\gamma$) is within the range $0.05 \leq (\beta - \gamma) \times 0.19 + \alpha \times 0.5 \leq 0.30$ in a case where $\beta > \gamma$, and $\beta$ and $\gamma$ is within the range $1 < (\beta/\gamma) \leq 3$,
   wherein a diameter of the core is 20 to 30 µm, and
   wherein the core does not contain germanium.

4. An ytterbium-doped optical fiber comprising a core containing at least ytterbium, aluminum and phosphorous and a clad surrounding the core,
   wherein a ratio of a molar concentration of diphosphorus pentoxide with respect to phosphorus in the core to a molar concentration of ytterbium oxide with respect to ytterbium in the core is 10 to 30,
   wherein a relative refractive index difference between the core and the clad is 0.05% 0.30%,
   wherein the molar concentration of ytterbium oxide ($\alpha$), a molar concentration of aluminum oxide with respect to aluminum in the core ($\beta$), and the molar concentration of diphosphorus pentoxide ($\gamma$) is within the range $0.05 \leq (\gamma - \beta) \times 0.04 + \alpha \times 0.5 \leq 0.30$, in a case where $\beta < \gamma$, and $\beta$ and $\gamma$ is within the range $0.56 \leq (\beta/\gamma) < 1$,
   wherein a diameter of the core is 20 to 30 µm, and
   wherein the core does not contain germanium.

* * * * *